(12) United States Patent
Torres

(10) Patent No.: US 9,293,248 B2
(45) Date of Patent: Mar. 22, 2016

(54) METHODS AND APPARATUS FOR EMI FILTER HAVING SWITCHED CAPACITANCE BASED ON LOADING

(71) Applicant: Raytheon Company, Waltham, MA (US)

(72) Inventor: Roland Torres, Los Alamitos, CA (US)

(73) Assignee: RAYTHEON COMPANY, Waltham, MA (US)

( * ) Notice: Subject to any disclaimer, the term of this patent is extended or adjusted under 35 U.S.C. 154(b) by 532 days.

(21) Appl. No.: 13/712,128

(22) Filed: Dec. 12, 2012

(65) Prior Publication Data

US 2014/0159498 A1 Jun. 12, 2014

(51) Int. Cl.
*H01F 38/00* (2006.01)
*H02M 1/12* (2006.01)

(52) U.S. Cl.
CPC ........ *H01F 38/00* (2013.01); *H02M 1/12* (2013.01)

(58) Field of Classification Search
CPC .......... H02G 7/20; H04B 15/02; H04B 15/00; H05K 9/00; H05K 9/0066; H01F 38/00; H02M 1/12
USPC .......................................................... 307/91
See application file for complete search history.

(56) References Cited

U.S. PATENT DOCUMENTS

| | | | | |
|---|---|---|---|---|
| 3,307,076 | A * | 2/1967 | Park ............................ | 361/110 |
| 3,555,291 | A * | 1/1971 | Dewey ........................ | 307/105 |
| 4,623,830 | A * | 11/1986 | Peneder et al. ............... | 318/798 |
| 2005/0067974 | A1* | 3/2005 | Trestman ............... | H05B 41/28 315/224 |
| 2006/0036388 | A1* | 2/2006 | Swarztrauber ............... | 702/107 |
| 2006/0056207 | A1* | 3/2006 | Sarlioglu ........................ | 363/44 |
| 2009/0290392 | A1* | 11/2009 | Ganev et al. .................... | 363/39 |
| 2011/0204189 | A1* | 8/2011 | Lynch et al. ............... | 246/34 B |
| 2012/0139458 | A1* | 6/2012 | Yoo .......................... | 318/400.01 |
| 2013/0070490 | A1* | 3/2013 | Liu et al. ........................ | 363/40 |
| 2013/0173078 | A1* | 7/2013 | Divan et al. .................. | 700/295 |

FOREIGN PATENT DOCUMENTS

EP 1 643 626 A2 5/2006

OTHER PUBLICATIONS

PCT Search REport of the ISA for PCT/US2013/060330 dated May 19, 2014.
PCT Written Opinion of the ISA for PCT/US2013/060330 dated May 19, 2914.
PCT International Preliminary Report on Patentability of the ISA dated Jun. 25, 2015: for PCT Pat. App. No. PCT'US2013/060330; 8 pages.

* cited by examiner

*Primary Examiner* — Thienvu Tran
*Assistant Examiner* — Brian K Baxter
(74) *Attorney, Agent, or Firm* — Daly, Crowley, Mofford and Durkee, LLP

(57) ABSTRACT

Methods and apparatus for providing a system, such as a power conditioner unit, including terminals to receive three-phase signals, respective filter inductors, and respective filter capacitors that are switched into the EMI filter when the loading is above a given threshold.

19 Claims, 6 Drawing Sheets

METHODS AND APPARATUS FOR EMI FILTER HAVING SWITCHED CAPACITANCE BASED ON LOADING

BACKGROUND

As is known in the art, EMI (electromagnetic interference) filters include capacitive and inductive components to achieve acceptable signal characteristics. As is also known, filter capacitance can result in a leading power factor, which is highly undesirable in some applications. Thus, there are tradeoffs in EMI filtering and power factor characteristics. In conventional applications, relatively large inductors are used to minimize the effects of the capacitance. However, large inductors are large, heavy and costly.

FIG. 1 shows an exemplary prior art EMI filter for a three-phase power system 10. First, second, and third phases A, B, C are input at respective terminals. Common mode inductors L1-3, which are relatively small, are coupled to each terminal. Each phase is filtered using inductive and capacitive elements. For example, the first phase A is filtered by inductor L4 and capacitor C1. The second phase B is filtered by inductor L5 and capacitor C2, and the third phase C is filtered by inductor L6 and capacitor C3. In the illustrated embodiment, the filter inductors are 50 micro henries, which are quite large, to balance out the 1 micro farad capacitance of the filter capacitors C1-3. In general, the large inductors are used to 'hide' the capacitance of the filter capacitance.

SUMMARY

The present invention provides method and apparatus for switching in filter capacitors into an EMI filter when a loading level exceeds a given threshold. By selectively switching in the filter capacitors as the loading increases, the impedance required by the filter inductors is reduced as compared to conventional non-switched capacitor filters that require large inductors to 'hide' the capacitors. While exemplary embodiments of the invention are shown and described having particular configurations, applications, components, and frequencies, it is understood that embodiments of the invention are applicable to EMI filtering applications in general in which it is desirable to reduce the size of the filter inductors.

In one aspect of the invention, a system comprises: a first terminal to receive a first phase signal of a three-phase signal, a second terminal to receive a second phase signal of the three-phase signal, a third terminal to receive a third phase signal of the three-phase signal, a first filter inductor to filter the first phase signal, a second filter inductor to filter the second phase signal, a third filter inductor to filter the third phase signal, a switch control module, comprising: a signal detection module coupled to the filtered first phase signal, a processor module coupled to the to signal detection module to determine if the filtered first phase signal exceeds a first threshold, a driver circuit coupled to the processor module, a first switch coupled to a first filter capacitor and to the driver circuit, a second switch coupled to a second filter capacitor and to the driver circuit, a third switch coupled to a third filter capacitor and to the driver circuit, wherein the processor module activates the driver circuit to actuate the first, second, and third switches when the first threshold is exceeded for coupling the first, second, and third filter capacitors into the EMI filter.

The system can further include one or more of the following features: the first, second, and third switches are contained in an EMI enclosure, the first threshold corresponds to a current level, the first threshold corresponds to about 50 percent loading, the first filter inductor is about 25 microhenries and the first phase signal is about 115V, 400 Hz, the first capacitor is about 2 microfarads, the driver module comprises a relay circuit, and/or a further capacitor switched into the EMI filter circuit when a second threshold is exceeded.

In another aspect of the invention, a system comprises: a first terminal to receive a first phase signal of a three-phase signal, a second terminal to receive a second phase signal of the three-phase signal, a third terminal to receive a third phase signal of the three-phase signal, a first filter inductor to filter the first phase signal, a second filter inductor to filter the second phase signal, a third filter inductor to filter the third phase signal, a switch control means comprising: a signal detection means coupled to the filtered first phase signal, a processor means coupled to the signal detection module to determine if the filtered first phase signal exceeds a first threshold, a driver means coupled to the processor module, a first switch means coupled to a first filter capacitor and to the driver means, a second switch means coupled to a second filter capacitor and to the driver means, and a third switch means coupled to a third filter capacitor and to the driver means, wherein the processor means activates the driver means to actuate the first, second, and third switch means when the first threshold is exceeded for coupling the first, second, and third filter capacitors into the EMI filter.

In a further aspect of the invention, a method comprises: employing first, second and third terminals to receive respective first, second, and third phase signals of a three-phase signal, employing a first, second, and third filter inductor to filter the respective first, second, and third phases of the three-phase signal, determining if the filtered first phase signal exceeds a first threshold, employing a first switch coupled to a first filter capacitor and to the driver circuit, a second switch coupled to a second filter capacitor and to the driver circuit, and a third switch coupled to a third filter capacitor and to the driver circuit, and actuating the first, second, and third switches when the first threshold is exceeded for coupling the first, second, and third filter capacitors into the EMI filter.

The method can further include one or more of the following features: enclosing the first, second, and third switches in an EMI enclosure, the first threshold corresponds to a current level, the first threshold corresponds to about 50 percent loading, the first filter inductor is about 25 microhenries and the first phase signal is about 115V, 400 Hz, the first capacitor is about 2 microfarads, and/or switching in a further capacitor into the EMI filter circuit when a second threshold is exceeded.

BRIEF DESCRIPTION OF THE DRAWINGS

The foregoing features of this invention, as well as the invention itself, may be more fully understood from the following description of the drawings in which.

DETAILED DESCRIPTION

Figure 1:
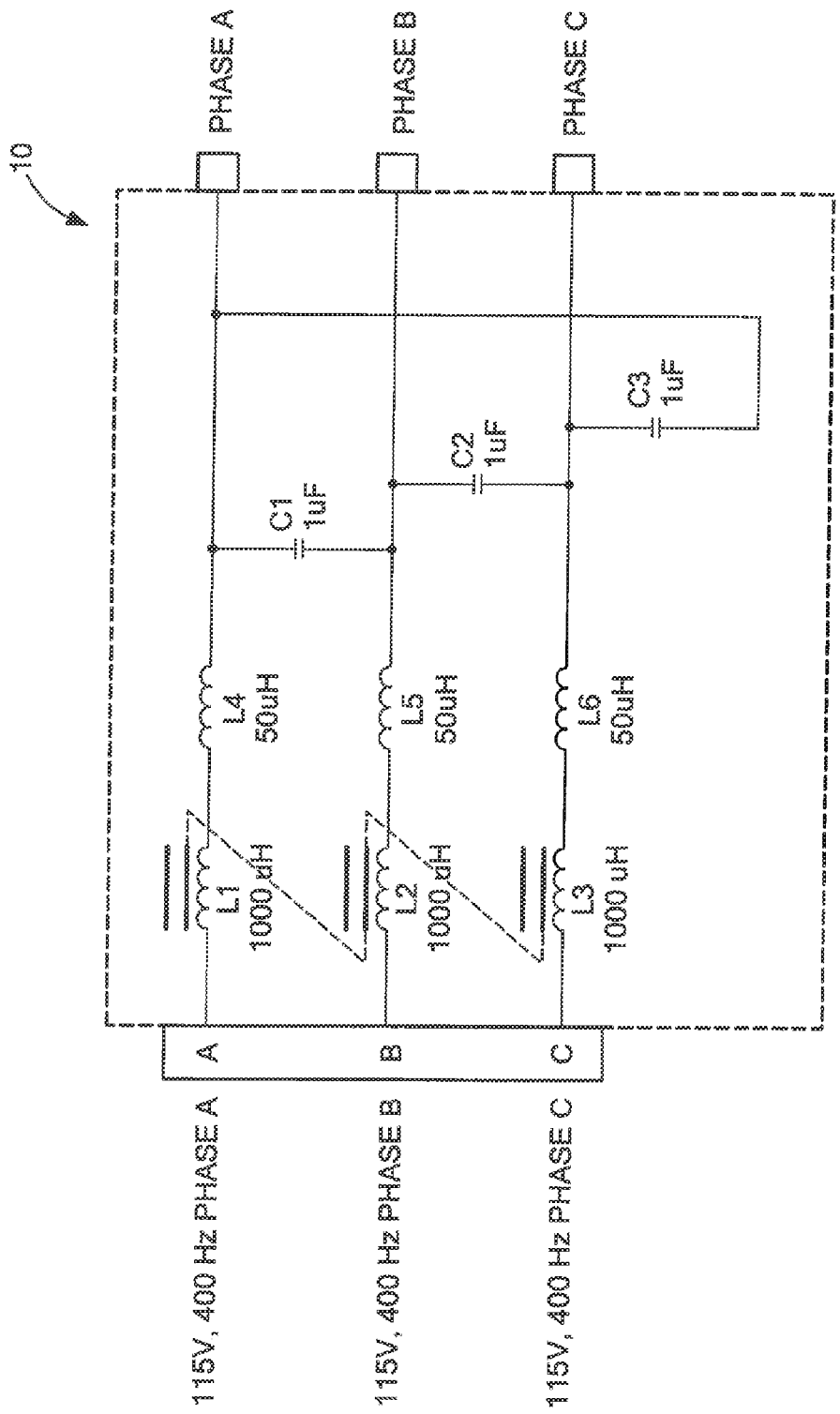
FIG. 1 is a schematic representation of a prior art EMI filter for a three-phase power application.
Figure 2:
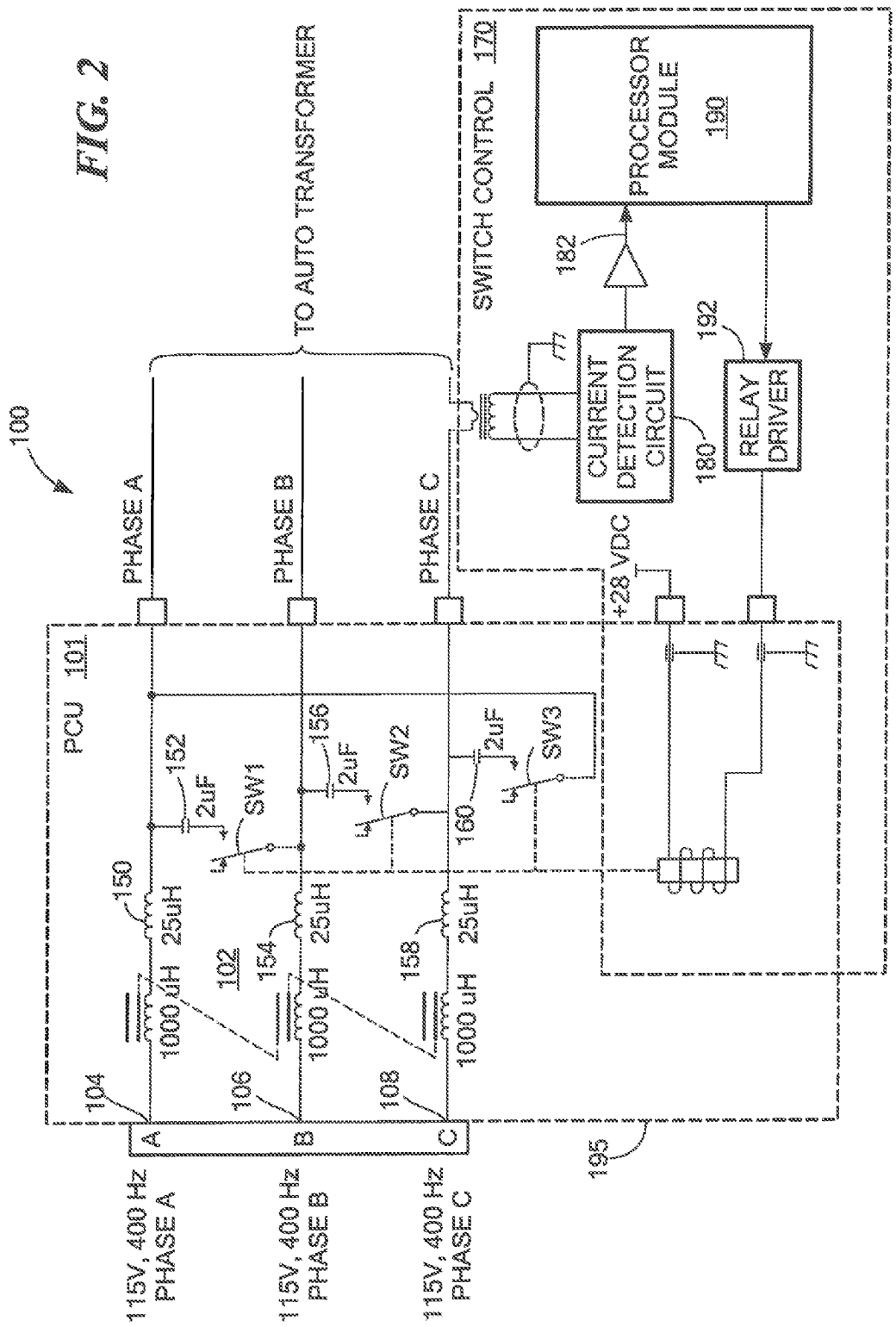
FIG. 2 is a schematic representation of an exemplary power conditioner unit (PCU) having EMI filtering with capacitive switching in accordance with exemplary embodiments of the invention.

FIG. 2 shows a three-phase power system 100 including a power conditioner unit (PCU) 101 having an EMI filter 102 in accordance with exemplary embodiments of the invention. In an exemplary embodiment, the PCU comprises the EMI filter 102, current detection, and processing, as described more fully below. In the illustrated embodiment, each of first, second, and third three-phase signals A, B, C comprise 115V, 400 Hz signals. The first phase signal A is received at a first terminal 104, the second phase signal B is received at a second terminal 106, and the third phase signal C is received at a third terminal 108.

Respective common mode inductors L1, L2, L3 are coupled to each of the phase terminals 104, 106, 108 in a conventional manner. In one embodiment, the common mode inductors have an inductance of about 1000 microhenries.

The EMI filter 102 filters the first, second, and third phase signals using inductive and selectively switched in capacitive components. The EMI filter 102 filters the first phase A with a first inductor 150 and a first capacitor 152. The EMI filter filters the second phase B with a second inductor 154 and a second capacitor 156 and filters the third phase C with a third inductor 158 and a third capacitor 160.

In an exemplary embodiment, the system 100 includes a switch control module 170 to switch the filter capacitors 152, 156, 160 in and out of the EMI filter 102. In one embodiment, the switch control module 170 includes a current detection circuit 180 coupled to one of the filtered phase signals, shown as phase C.

The current detection circuit 180 provides a phase current level signal 182 to a processor module 190. The processor module 190 determines whether the current level signal 182 is above a first threshold corresponding to a percentage of full load. For example, the first threshold can correspond to a half load (50% loading) condition. If the processor module 190 receives a current level indicating that the system is at half load or greater, the first threshold is exceeded and the filter capacitors 152, 156, 160 should be switched into the EMI filter 102.

In an exemplary embodiment, the processor module 190 controls a driver circuit 192, such as a relay driver, that opens and closes a series of switches SW1-3, such as via a solenoid. When the first switch SW1 closes, the first filter capacitor 152 is coupled into the EMI filter. When the first switch SW1 is open, the first filter capacitor is not coupled into the EMI filter.

In one embodiment, when the phase current seen by the current detection module 180 is below the first threshold, the filter capacitors 152, 156, 160 are switched out of the circuit by the switches SW1-3 so that under this low load condition the capacitors do not contribute to a leading power factor. When the load increases so that the phase current is above the first threshold, the filter capacitors 152, 156, 160 are switched into the circuit to provide needed EMI filtering of the phase signals. At currents above the first threshold, the overall impedance of the filter inductors 150, 154, 158, filter capacitors 152, 156, 160, and load result in a lagging power factor as desired.

It is understood that the processor module 190 can comprise a variety of configurations. In one embodiment, the processor module comprises a Field Programmable Gate Array (FPGA) having one or more thresholds to switch in respective capacitor banks. In an alternative embodiment, the processor module 190 comprises a computer having a processor, such as the computer shown in FIG. 5. It is understood that the processor module 190 can include any practical combination of hardware and/or software components. In one embodiment, the processor module 190 includes a user interface that enables a user to program thresholds for the filter capacitors and otherwise interact with the system, In another embodiment, the processor module comprises one or more comparators the output of which activates the relay driver to switch in one or more filter capacitors.

In one embodiment, the EMI filter components, including the filter capacitor switches SW1-3, are contained in an EMI enclosure. It is understood that an EMI filter filters conducted emissions and guards against developing radiated emissions. To this end, in one embodiment the filter components are housed in a Faraday shield or enclosure including the relay or switching mechanism because the capacitors are inside the enclosure. The switching mechanism control voltage or relay drive voltage is filtered to prevent EMI from escaping and preventing outside noise from contaminating the input signals.

By switching the capacitors, the inductors (150, 154 and 158) can be relatively small as compared to conventional configurations. Since the inductors can be significantly smaller in value and size, the size of the enclosure can be reduced. By using a smaller enclosure, less potting material is needed. The result is a smaller and lighter EMI filter. Also, by switching the capacitors, a lagging power factor is achieved at no load to light load. By switching at half or full load, for example, enhanced EMI performance is achieved.

Figure 3:
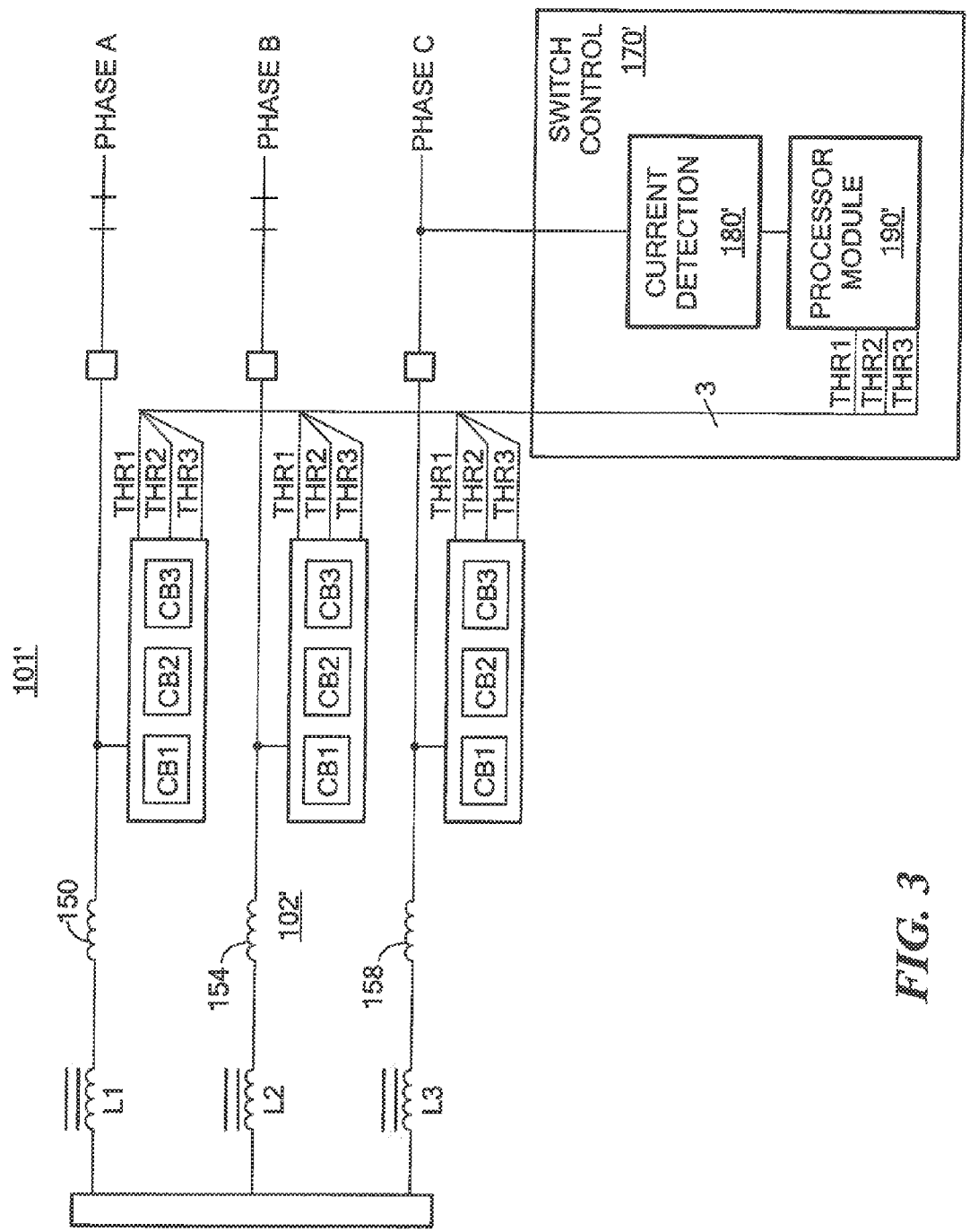
FIG. 3 is a schematic representation of a further embodiment of a PCU having EMI filtering with capacitive switching in accordance with exemplary embodiments of the invention.

In another embodiment, shown in FIG. 3, a switch control module 170' includes a current detection circuit 180' and a processing module 190' that detects a load level on the phase signal above first, second, and third thresholds. A series of capacitor banks CB1, CB2, CB3, are switched into the EMI filter 102' based upon which of the thresholds are exceeded. In one embodiment, a first capacitor bank CB1 is switched into the filter circuit for the first phase A when the first threshold is exceeded after the first threshold active signal THR1 is activated by the processor module 190'. Similarly, the second capacitor bank CB2 is switched in when the phase current exceeds the second threshold to activate the THR2 signal, and the third capacitor bank CB3 is switched in when the phase current exceeds the third threshold to activate the THR3 signal. In one embodiment, the first threshold corresponds to 25% loading, the second threshold corresponds to 50% loading, and the third threshold corresponds to 75% loading.

It is understood that any practical number of capacitor banks corresponding to respective thresholds can be switched in and out of the EMI filter to meet the needs of a particular application.

Figure 3A:
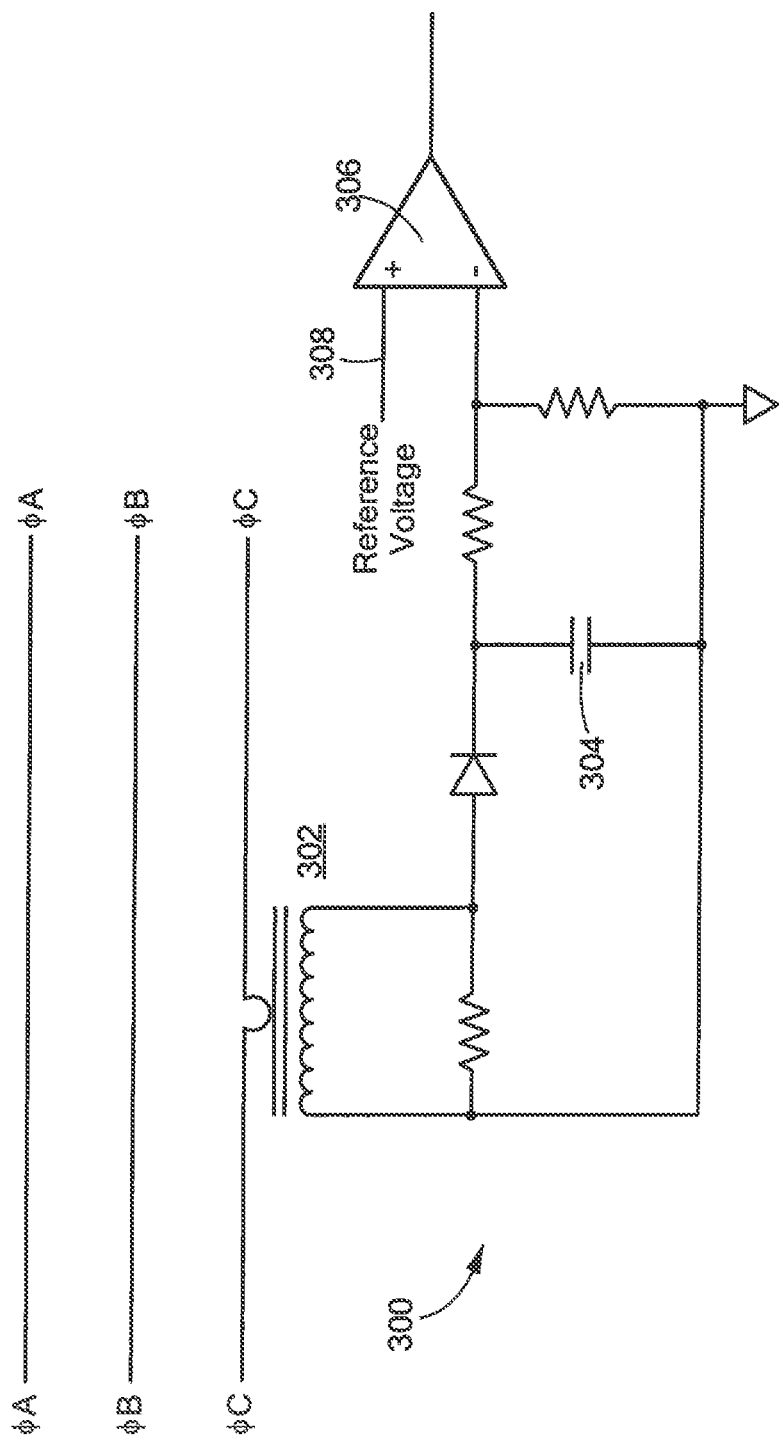
FIG. 3A is a schematic representation of an exemplary current detection implementation.

It is further understood that any suitable current detection device, such as Hall effect sensor, current sense transformer, half wave rectification, peak charging, and the like, can be used. FIG. 3A shows an exemplary current detection module 300 with a current sense transformer 302 coupled to a first phase signal. A charging capacitor 304 is charged to a given voltage level during operation of the circuit. A comparator 306 compares the voltage on the charging capacitor 304 to a reference voltage 308 to determine when the threshold set by the reference voltage is exceeded.

As noted above, in some applications it is highly desirable to avoid a leading power factor. Table 1 below shows exemplary power factor values at the listed loads for a conventional design and the embodiment of FIG. 2.

TABLE 1

| | POWER FACTOR | |
|---|---|---|
| LOAD | LEGACY DESIGN | FIG. 2 |
| PCU off, no load | 0.1253 LEADING | 1.0000 |
| PCU on, minimal load | 0.6079 lagging | 0.4707 lagging |
| PCU on, 2.4 kW load | 0.9985 lagging | 0.9985 lagging |
| PCU on, 13.6 kW load | 0.9982 lagging | 0.9982 lagging |

Figure 4:
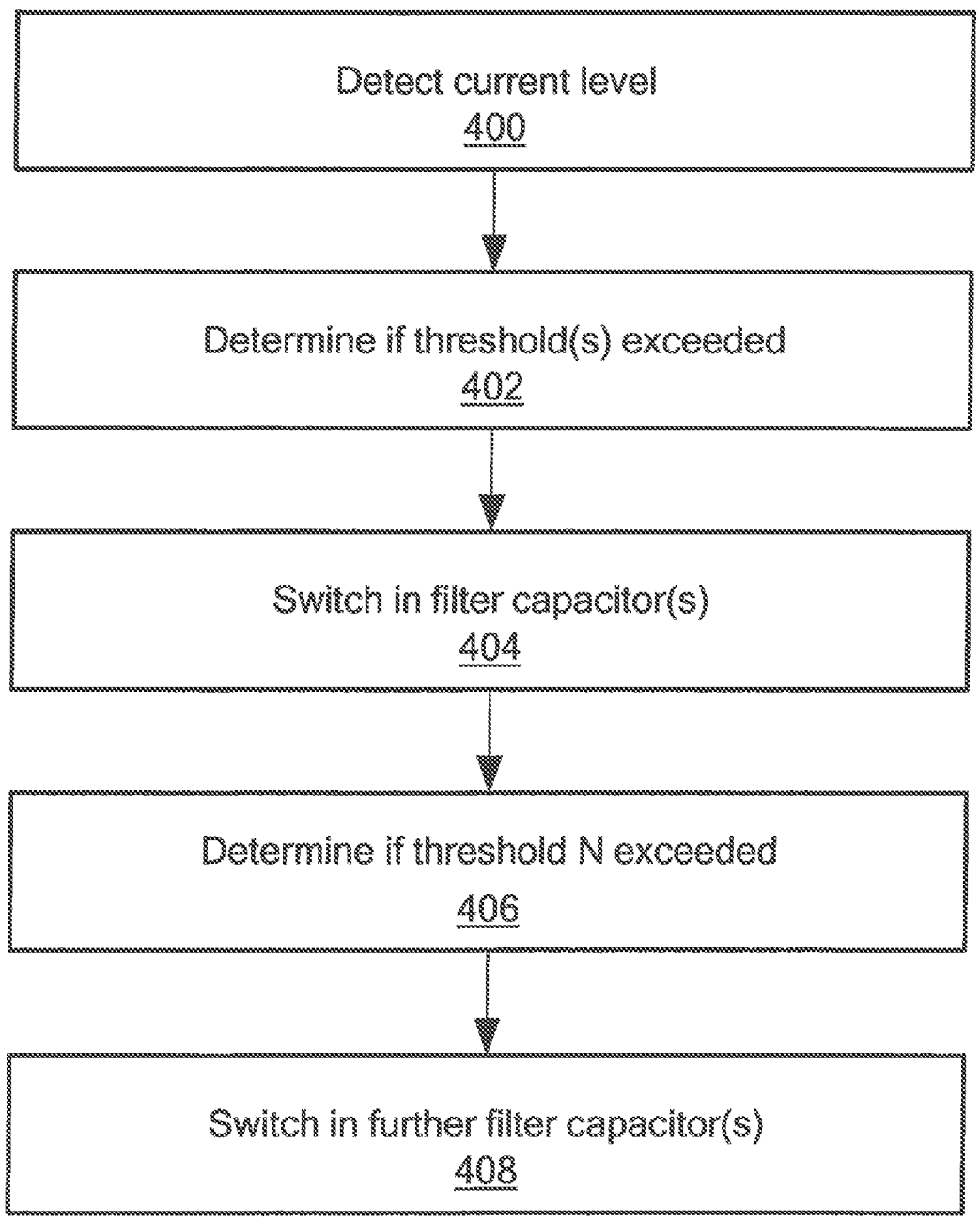
FIG. 4 is a flow diagram showing an exemplary sequence of steps to provide a power conditioner unit having capacitive switching in accordance with exemplary embodiments of the invention.

FIG. 4 shows an exemplary sequence of steps to provide EMI filtering with switchable capacitors in accordance with exemplary embodiments of the invention. In step 400, a current level, or other characteristic, of one or more conditioned phase signals in a three-phase system, is determined by a sensor. In step 402, it is determined whether one or more thresholds are exceeded, where each of the thresholds corresponds to a loading level. In step 404, a respective filter capacitor in the EMI filter is switched into the filter for the three phases, if, for example, the first threshold is exceeded. In one embodiment, the filter capacitor is switched into the EMI filter circuit if the loading level is greater than 50 percent. In optional step 406, it is determined whether a further threshold, e.g., 75% loading, is exceeded. In optional step 408, if the further threshold is exceeded additional filter capacitors are switched into the circuit.

As described above, filter capacitors are switched in to provide EMI filtering when a load is present and switched out When the filter capacitors result in an undesirable leading power factor when the load is not present. Exemplary embodiments of the invention address a long-standing need for non-leading power factor in aircraft power systems, for example. Attempts to solve this problem involve hiding the filter capacitors with large, bulky and expensive inductors. Some systems, such as ground surveillance radars, require bulky inductors and a sensitive start up sequence to avoid shutting down the generator. In addition, the switches can be embedded inside the EMI-sealed enclosure of the filter for enhanced internal and external EMI performance.

By switching in the capacitors (see, e.g., FIG. 2), the inductors (150, 154 and 158) can be reduced in size as compared to non-switched capacitor filters. The inductors can be significantly smaller in value and size, thus reducing the space needed for a large enclosure. By using a smaller enclosure, less potting material is needed. The result is a smaller and lighter EMI filter.

Figure 5:
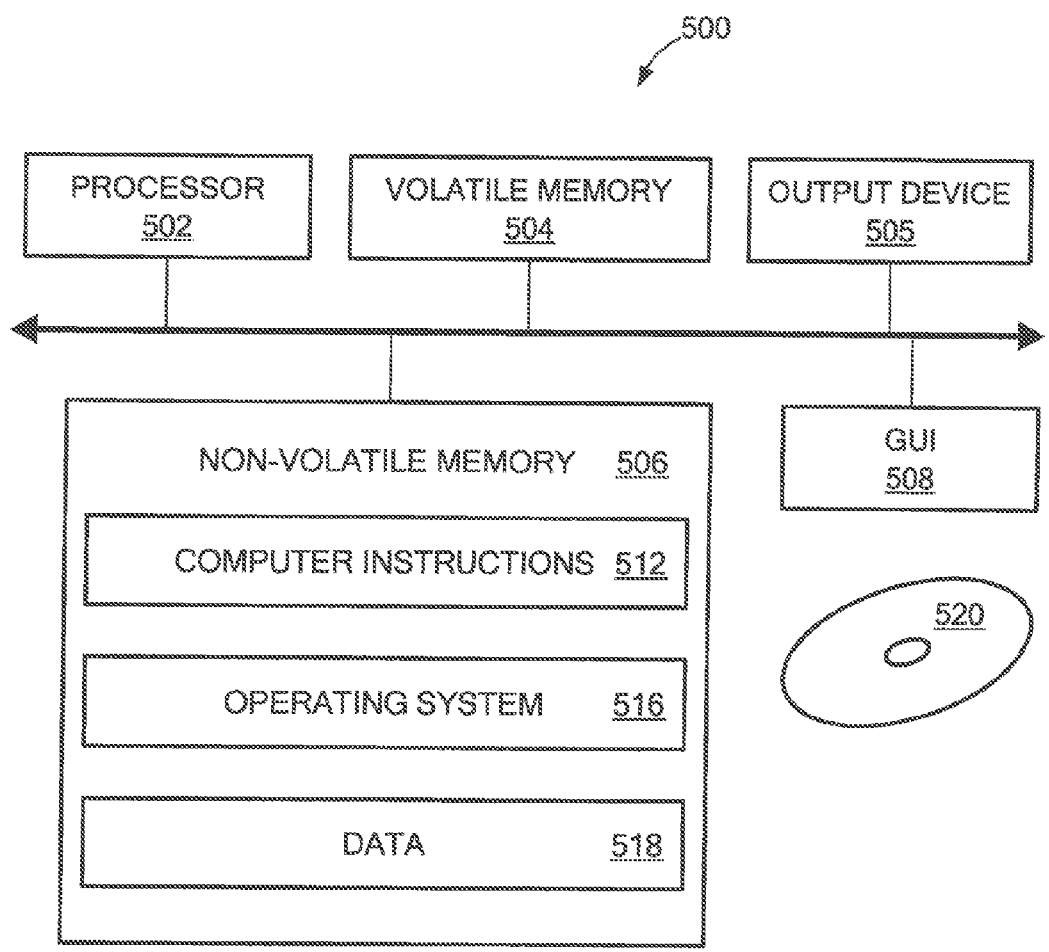
FIG. 5 is a schematic representation of an exemplary computer than can perform at least a portion of processing described herein.

FIG. 5 shows an exemplary computer 500 that can perform at least part of the processing described herein. The computer 500 includes a processor 502, a volatile memory 504, a non-volatile memory 506 (e.g., hard disk), AND a graphical user interface (GUI) 508 (e.g., a mouse, a keyboard, a display, for example). The non-volatile memory 506 stores computer instructions 512, an operating system 516 and data 518 including the Q files, for example. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An electromagnetic interference (EMI) filter system, comprising:
   a first terminal to receive a first phase signal of a three-phase signal;
   a second terminal to receive a second phase signal of the three-phase signal;
   a third terminal to receive a third phase signal of the three-phase signal;
   a first filter inductor to filter the first phase signal;
   a second filter inductor to filter the second phase signal;
   a third filter inductor to filter the third phase signal; and
   a switch control module, comprising:
      a signal detection module coupled to the filtered first phase signal;
      a processor module coupled to the signal detection module to determine if the filtered first phase signal exceeds a first threshold;
      a driver circuit coupled to the processor module;
      a first switch coupled to a first filter capacitor bank and to the driver circuit, each capacitor of the first filter capacitor bank coupled to the filtered first phase signal;

a second switch coupled to a second filter capacitor bank and to the driver circuit, each capacitor of the second filter capacitor bank coupled to the filtered second phase signal; and a third switch coupled to a third filter capacitor bank and to the driver circuit, each capacitor of the third filter capacitor bank coupled to the filtered third phase signal, wherein the processor module activates the driver circuit to generate a lagging power factor of the three-phase signal by actuating at least one of the first, second, and third switches when the first threshold is exceeded for coupling at least one capacitor from each of the first, second, and third filter capacitor banks into the EMI filter.

2. The system according to claim 1, wherein the first, second, and third switches are contained in an EMI enclosure.

3. The system according to claim 1, wherein the first threshold corresponds to a current level.

4. The system according to claim 1, wherein the first threshold corresponds to about 50 percent loading.

5. The system according to claim 1, wherein the first filter inductor is about 25 microhenries and the first phase signal is about 115V, 400 Hz.

6. The system according to claim 5, wherein the first capacitor is about 2 microfarads.

7. The system according to claim 1, wherein the driver module comprises a relay circuit.

8. The system according to claim 1, wherein at least one additional capacitor of each of the first, second, and third filter capacitor banks is switched into the EMI filter circuit when a second threshold is exceeded.

9. A system, comprising:
a first terminal to receive a first phase signal of a three-phase signal;
a second terminal to receive a second phase signal of the three-phase signal;
a third terminal to receive a third phase signal of the three-phase signal;
a first filter inductor to filter the first phase signal;
a second filter inductor to filter the second phase signal;
a third filter inductor to filter the third phase signal; and
a switch control means comprising:
    a signal detection means coupled to the filtered first phase signal;
    a processor means coupled to the signal detection module to determine if the filtered first phase signal exceeds a first threshold;
    a driver means coupled to the processor module;
    a first switch means coupled to a first filter capacitor bank and to the driver means, each capacitor of the first filter capacitor bank coupled to the filtered first phase signal;
    a second switch means coupled to a second filter capacitor bank and to the driver means, each capacitor of the second filter capacitor bank coupled to the filtered second phase signal; and
    a third switch means coupled to a third filter capacitor bank and to the driver means, each capacitor of the third filter capacitor bank coupled to the filter third phase signal,
wherein the processor means activates the driver means to generate a lagging power factor of the three-phase signal by actuating at least one of the first, second, and third switch means when the first threshold is exceeded for coupling at least one capacitor from each of the first, second, and third filter capacitor banks into the EMI filter.

10. A method, comprising;
employing first, second and third terminals to receive respective first, second, and third phase signals of a three-phase signal;
employing a first, second, and third filter inductor to filter the respective first, second, and third phases of the three-phase signal;
determining if the filtered first phase signal exceeds a first threshold;
employing a first switch coupled to a first filter capacitor bank and to the driver circuit, each capacitor of the first filter capacitor bank coupled to the filtered first phase signal, a second switch coupled to a second filter capacitor bank and to the driver circuit, each capacitor of the second filter capacitor bank coupled to the filtered second phase signal, and a third switch coupled to a third filter capacitor and to the driver circuit, each capacitor of the third filter capacitor bank coupled to the filter third phase signal; and
generating a lagging power factor of the three-phase signal by actuating at least one of the first, second, and third switches when the first threshold is exceeded for coupling at least one capacitor from each of the first, second, and third filter capacitor banks into the EMI filter.

11. The method according to claim 10, further including enclosing the first, second, and third switches in an EMI enclosure.

12. The method according to claim 10, wherein the first threshold corresponds to a current level.

13. The method according to claim 10, wherein the first threshold corresponds to about 50 percent loading.

14. The method according to claim 10, wherein the first filter inductor is about 25 microhenries and the first phase signal is about 115V, 400 Hz.

15. The method according to claim 14, wherein the first capacitor is about 2 microfarads.

16. The method according to claim 10, further including switching at least one additional capacitor of each of the first, second, and third filter capacitor banks into the EMI filter circuit when a second threshold is exceeded.

17. The system of claim 1, wherein the processor is further configured to:
reduce a leading power factor of the three-phase signal by de-actuating at least one of the first, second, and third switches when the first threshold is not exceeded for de-coupling at least one capacitor from each of the first, second, and third filter capacitor banks into the EMI filter.

18. The system of claim 9, wherein the processor means is further configured to:
reduce a leading power factor of the three-phase signal by de-actuating at least one of the first, second, and third switches when the first threshold is not exceeded for de-coupling at least one capacitor from each of the first, second, and third filter capacitor banks into the EMI filter.

19. The method of claim 10, further comprising:
reducing a leading power factor of the three-phase signal by de-actuating at least one of the first, second, and third switches when the first threshold is not exceeded for de-coupling at least one capacitor from each of the first, second, and third filter capacitor banks into the EMI filter.

* * * * *

UNITED STATES PATENT AND TRADEMARK OFFICE
CERTIFICATE OF CORRECTION

| | |
|---|---|
| PATENT NO. | : 9,293,248 B2 |
| APPLICATION NO. | : 13/712128 |
| DATED | : March 22, 2016 |
| INVENTOR(S) | : Roland Torres |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this
Fifth Day of July, 2016

Michelle K. Lee
*Director of the United States Patent and Trademark Office*